(12) United States Patent
Singh

(10) Patent No.: US 12,181,938 B2
(45) Date of Patent: Dec. 31, 2024

(54) TEMPERATURE MANAGEMENT FOR AN INFORMATION HANDLING SYSTEM

(71) Applicant: Dell Products L.P., Round Rock, TX (US)

(72) Inventor: Ravi Shekhar Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 409 days.

(21) Appl. No.: 17/866,651

(22) Filed: Jul. 18, 2022

(65) Prior Publication Data

US 2024/0019913 A1 Jan. 18, 2024

(51) Int. Cl.
 *G06F 1/20* (2006.01)
(52) U.S. Cl.
 CPC ..................................... *G06F 1/20* (2013.01)
(58) Field of Classification Search
 CPC ........ G06F 1/20; G06F 1/206; H05K 7/20836
 See application file for complete search history.

(56) References Cited

U.S. PATENT DOCUMENTS

| | | | | |
|---|---|---|---|---|
| 2016/0162206 A1* | 6/2016 | Bish | ...................... | G06F 3/0653 711/165 |
| 2018/0359882 A1* | 12/2018 | Lovicott | ............ | H05K 7/20727 |
| 2021/0255799 A1* | 8/2021 | Kale | ...................... | G06N 3/049 |
| 2022/0091954 A1* | 3/2022 | Zhao | ...................... | G11C 16/10 |

* cited by examiner

*Primary Examiner* — Mong-Shune Chung
(74) *Attorney, Agent, or Firm* — Norton Rose Fulbright US LLP

(57) ABSTRACT

Temperature regulation at one or more modules of an information handling system is challenging due to a large number of sensors from which data is to be read, to a lack of information from which the temperature of the module or associated temperature tolerances can be determined, or both. The disclosure obviates reliance on data derived from sensors and does not rely on temperature tolerance data to regulate a temperature at a module. Access data is obtained that includes a number of accesses to the module, a time at which each access of the number of accesses occurs, or both. A temperature pattern is derived, based on the access data, and that corresponds to a temperature profile of the module. Open-loop control of a cooling device is initiated, based on the temperature patterns, to regulate a temperature of the module, a temperature profile of the module, or both.

20 Claims, 5 Drawing Sheets

TEMPERATURE MANAGEMENT FOR AN INFORMATION HANDLING SYSTEM

FIELD OF THE DISCLOSURE

The instant disclosure relates to information handling systems. More specifically, portions of this disclosure relate to techniques to manage heat in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While in operation, the electronics of an information handling system generate and dissipate heat. In some cases, this heat can reduce an efficiency of the electronics, can damage the electronics, or both. As the density of electronics in information handling systems increase, the amount of heat generated and dissipated by the electronics increases with a resulting increase in the likelihood of damage to and/or degradation in the performance of the electronics from the dissipated heat. As examples, the memory and input/output (I/O) modules of information handling systems each have a high density of electronic components, some of which are sensitive to heat, thereby increasing a likelihood of heat-related failure or operational degradation.

SUMMARY

This disclosure relates to deriving a temperature pattern corresponding to a temperature profile of a module (e.g., a memory, an input/output (I/O) device) of an information handling system based on access data and initiating open-loop control of a cooling device of the information handling system in response to the temperature pattern. Access data may include a number of accesses to the module (e.g., read operations performed at the module, write operations performed at the module, etc.), a time at which each access of the number of accesses occurs, or both. An access rate, corresponding to a rate of change of the access data, may be determined based on the access data. The access rate may be proportional to a power usage of the module, and because power usage of the module is proportional to a temperature of the module, the access rate may be used to determine a temperature profile of the module. Temperature fluctuations in the module over time, corresponding to a temperature profile of the module, may be determined from the access data. In response to identifying first criteria, such as an increasing access rate, which is indicative of increasing temperature at the module, open-loop control of a cooling device is initiated to regulate the temperature at the module. Open-loop control of the cooling device may include non-feedback control of the cooling device in which data, such as temperature and/or voltage measurements, taken from sensors at or near the module, is not used to effectuate control of the cooling device to achieve temperature regulation at the module. Subsequently, second criteria, such as a temperature measurement and/or further increasing access rate, may be used to initiate closed loop control to further regulate the temperature at the module.

To counteract heat generated by modules, information handling systems may be equipped with cooling devices and control systems to govern the operation of these cooling devices for the purpose of controlling temperatures to within certain rated limits. Memory may include temperature sensors, such as, in some devices, a sensor for each memory module, from which temperature data may be derived. Additionally, data power regarding the memory may be determined by a voltage regulator (VR) circuit on a motherboard that provides power to the memory. The temperature data and power data may be provided to a closed-loop control system that governs operation of one or more cooling systems, such as one or more fans, that dissipate heat through movement of air through and around the electronics until temperatures fall to acceptable levels, such as levels set by one or more standards setting bodies or to levels known to be acceptable for electronic components.

While these heat dissipation strategies have achieved adequate results in some cases, they are ineffective in others. Temperature measurements from memory modules take time and provide information about increased temperature in the memory only after the temperature rises have happened. The temperature measurements may become cumbersome when there are a large number of sensors. For example, the number of memory modules in a memory device are increasing, as are the number of temperature sensors. Reading each temperature sensor is time consuming, with the result that closed loop control systems receive delayed temperature data and thus are unable to respond quickly to rapid rises in temperature. Additionally, in some systems power data may be unavailable which, combined with the difficulty in obtaining sensor measurements, may reduce the accuracy of closed-loop temperature control systems.

As another example, typical heat mitigation strategies often fail for I/O modules (sometimes referred to as "I/O modules"), such as for graphics cards. In many cases, I/O modules either lack temperature sensors or are provided by external vendors, with the result that temperature data and power consumption information might be unavailable or difficult to obtain. The lack of reliable temperature data, power data, or both constrains closed-loop control systems, thereby reducing an effectiveness of these systems in mitigation heat build-up in I/O modules.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

According to one embodiment, an apparatus may include a controller configured to couple to a module and to couple to a cooling device. The controller may include logic circuitry and a memory. The logic circuitry may be configured to perform steps that include storing access data in the memory. The access data may include a first value corresponding to a number of accesses to the module. Additionally, the logic circuitry may be configured to perform steps that further include determining temperature patterns based on the access data and initiating open-loop control of the cooling device, based on the temperature patterns, to regulate a temperature of the module, an environment proximate to the module, or both In certain embodiments, the module may include a memory device. The number of accesses to the module may include a number of times that data is written to the memory device, that data is read from the memory device, or both.

In certain embodiments, the temperature patterns may be configured to predict fluctuations in the temperature over a specified timeframe.

In certain embodiments, the access data may further include a second value corresponding to a time at which each access of the number of accesses occurs.

In certain embodiments, the logic circuitry configured to perform the steps that include determining the temperature patterns based on the access data may further include the logic circuitry configured to perform the steps that include determining an access rate of the module based on the access data.

In certain embodiments, the access rate may correspond to a rate of change of the access data over a specified timeframe. Additionally, the logic circuitry configured to perform the steps that include initiating the open-loop control of the cooling device may include the logic circuitry further configured to perform the steps comprising initiating the open-loop control of the cooling device in response to an increasing access rate.

In certain embodiments, the logic circuitry may be further configured to perform the steps that include retrieving the access data from the memory. Moreover, the logic circuitry configured to perform the steps that include determining the temperature patterns based on the access data further may include the logic circuitry configured to perform the steps that may include periodically checking the memory to determine whether updated access data has been stored in the memory and, in response to updated access date being stored in the memory, updating the temperature patterns based on the updated access data.

In certain embodiments, the logic circuitry may be further configured to perform the steps that include initiating closed loop control of the cooling device. The logic circuitry configured to perform the steps that include initiating closed loop control of the cooling device further may include the logic circuitry configured to perform the steps that include initiating the closed loop control of the cooling device after initiating open-loop control of the cooling device and in response to second criteria. The second criteria may include a temperature measurement of the temperature, a temperature pattern of the temperature patterns indicating a rapidly increasing temperature of the module, or both.

In certain embodiments, the apparatus may be positioned within an information handling system. Additionally, the cooling device may include a fan configured to cool the module.

According to another embodiment, an information handling system may include a memory. The memory may include one or more memory modules configured to store data. Additionally, the memory may include one or more memory controllers coupled to the one more memory modules. The one or more memory controllers may be configured to determine, based on access data, temperature patterns corresponding to a temperature profile of the one or more memory modules. The access data may include a number of accesses to the one or more memory modules. Moreover, the one or more memory controllers may further be configured to initiate, based on the first temperature patterns, open-loop control of a cooling device. The cooling device may be configured to regulate a temperature of the one or more memory modules. Moreover, the cooling device may be coupled to at least one memory controller of the one or more memory controllers.

In certain embodiments, the one or more memory controllers may further include one or more registers configured to store the access data.

In certain embodiments, the one or more memory modules may be configured to store the access data.

In certain embodiments, the access data may further include time values that may correspond to each of the number of accesses. Moreover, the one or more memory controllers configured to determine the temperature patterns may include the one or more memory controllers configured to determine an access rate of the access data. Additionally, the one or more memory controllers configured to initiate, based on the temperature patterns, the open-loop control of the cooling device may include the one or more memory controllers configured to initiate the open-loop control in response to the access rate.

In certain embodiments, the access rate may correspond to a rate of change of the access data.

In certain embodiments, the one or more memory controllers configured to initiate the open-loop control in response to the temperature patterns may include the one or more memory controllers configured to initiate the open-loop control in response to an increasing access rate.

According to another embodiment, a method for temperature regulation is provided. The method may include retrieving, by a processor of an information handling system, access data. The access data may include a number of accesses to a module of the information handling system. Moreover, the method may include determining, by the processor of the information handling system, a temperature pattern based on the access data, the temperature pattern corresponding to a temperature profile of the module, an environment proximate to the module, or both. Further, the method may include initiating, by the processor of the information handling system and in response to the temperature pattern, open-loop control of a cooling device of the information handling system. The cooling device may be configured to regulate the temperature profile.

In certain embodiments, determining, by the processor of the information handling system, the temperature pattern includes determining, by the processor of the information handling system, an access rate indicative of a rate of change of the access data.

In certain embodiments, determining, by the processor, the temperature pattern further includes periodically checking, by the processor and at one or more memories of the information handling system for updated access data. The method may further include, updating, by the processor and in response to the updated access data, the temperature pattern based on the updated access data.

In certain embodiments, the method may further include, after initiating open-loop control, initiating, by the processor of the information handling system, closed loop control of the cooling device in response to second criteria. The second criteria may include a temperature measurement of a temperature of the module.

In certain embodiments, the module may include a plurality of memory modules or an input/output (I/O) module, and the I/O module may comprise a graphics card.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
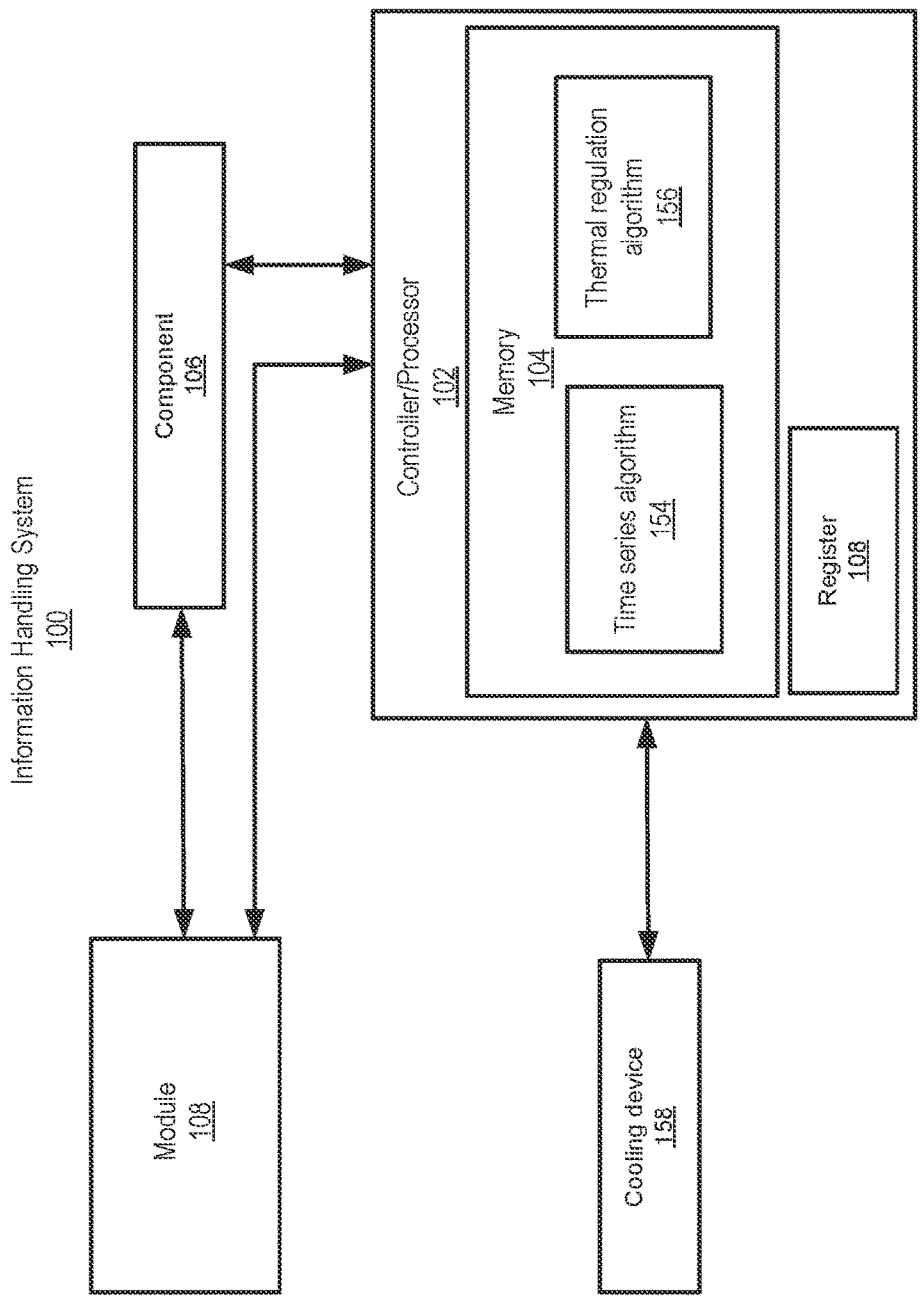
FIG. 1 is a schematic block diagram of an example information handling system depicting a thermal management concept according to some embodiments of the disclosure.

These example embodiments describe and illustrate various technical solutions to manage heat generation and dissipation in components of an information handling system. In some embodiments, a number of times during which components, such as one or more memory modules, one or more I/O modules, and/or other components, of an information handling system are accessed (e.g., access data), through, for instance, read operations and write operations, is used to determine an amount of power being consumed by such components and to appropriately control cooling of the components. Additionally, the times at which each access of the number of accesses occur may be useful to determine an access rate of these accesses, generally corresponding to a rate at which the accesses occur over time. Power usage may have a predetermined relationship to heat generation, such as a linear relationship, and thus, the number of times during which components are accessed, the times during which these accesses occur, or both may be used to derive temperature patterns corresponding to a temperature profile of a component (e.g., a module). The temperature patterns may reflect an environment proximate to the component of the information handling system, the temperature of a module, or both and may also reflect changes in the temperature of the module an/or an environment proximate to the module over time. The temperature patterns may indicate increasing temperature, decreasing temperatures, and/or rates at which a temperature may increase and/or decrease. These temperature patterns then may be used to implement open-loop control of one or more cooling devices of the information handling system. Open-loop control may consume less power than closed loop control and can be deployed to reduce a temperature of a component, of an environment proximate to the component, or both. Alternatively or additionally, open-loop control may be used to reduce a rate of increase of the temperature of a component, an environment proximate to the component, or both. In embodiments, after open-loop control of a cooling device causes the temperature of a component and/or an environment proximate to the component to fall, a rate of temperature increase at the component and/or an environment proximate to the component to fall, or both, closed loop control of the one or more cooling devices may be initiated.

The disclosure provides numerous advantages. Deriving temperature patterns associated with a component and/or an environment proximate to the component based on access data reduces reliance on temperature sensors, voltage regulators (VRs), or similar devices in controlling temperatures. Deriving temperature patterns from access data, which is readily available on a register or memory, may reduce an amount of time to react to rapid temperature increases at components, in an environment proximate to components, or both. Thus, temperature fluctuations in or proximate to components can be more easily identified and mitigated, thereby reducing a probability of damage to the components, performance deterioration of the components, or both.

Additionally, deriving temperature patterns associated with a component, an environment proximate to the component, or both based on access data is advantageous in circumstances in which a component lacks sensors from which a temperature at or proximate to the component can be measured and/or VRs from which power use at the component can be calculated. For example, I/O devices, such as graphics cards, may lack temperature sensors, VRs, and other components from which a temperature and/or a voltage can be measured. Alternatively or additionally, even if such components include sensors, the temperature tolerances of these components may be unknown. Therefore, by deriving temperature patterns associated with such components based on access data, the lack of means to directly measure a temperature, a voltage, or both at such components can be circumvented. Additionally, because open-loop control is initiated based on temperature patterns associated with the components (e.g., increasing temperature over time, accelerated rate of temperature increase over time, etc.), knowledge of heat tolerances of the component is unnecessary, since open-loop control may be initiated based on identifying a pattern indicative of temperature increase rather than based on exceeding a threshold temperature of one or more components of an information handling system.

Moreover, implementing open-loop control of cooling devices based on derived temperature patterns associated with a component prior to implementing closed loop control of the cooling devices may reduce an amount of power expended to regulate temperature at a component and/or in an environment proximate to the component. In particular, open-loop control of cooling devices generally uses less power than closed loop control. By using open-loop control of cooling devices to reduce a temperature of a component, the component is protected from thermal degradation or damage while reducing an amount of power used to achieve this temperature reduction.

In some embodiments, aspects of this disclosure, such as the open-loop temperature control, may be used in information handling systems, although the control techniques may also be used in other systems. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Referring to FIG. 1, a schematic block diagram of an example information handling system 100 depicting a thermal management concept according to some embodiments of the disclosure is illustrated. Information handling system 100 includes controller/processor 102, module 108, component 106, and cooling device 158. Controller/processor 102 may be coupled to module 108, to cooling device 158, to component 106, or to any combination thereof.

Module 108 may include or may correspond to a memory module (e.g., one or more memory modules), an input/output (I/O) module (e.g., a graphics card), or both. In other implementations, module 108 may include or may correspond to one or more other components of information handling system 100. Component 106 may correspond to any component of information handling system 100. During operation of information handling system 100, component 106 may be configured to access module 108, such as by reading data from module 108, writing data to module 108, or both. Cooling device 158 may correspond to one or more cooling devices configured to regulate a temperature at module 108, proximate to an environment of module 108, or both. For example, cooling device 158 may be one or more fans. Alternatively or additionally, cooling device 158 may be a phase change material responsive to temperature fluctuations.

Controller/processor 102 may include or correspond to a memory controller or an I/O controller. Alternatively, controller/processor 102 may correspond to one or more stand-alone processors of information handling system 100. Controller/processor 102 may include memory 104 that is configured to store instructions, executable by controller/processor 102, such as instructions corresponding to time series algorithm 154, thermal regulation algorithm 156, or both. Alternatively, memory 104 may be a separate component from controller/processor 102. Additionally, controller/processor 102 may include register 108 that is configured to store access data. Access data may include a first value corresponding to a number of accesses to module 108, a second value corresponding to a time at which each access of the number of accesses is made, or both. To illustrate, in response to a component of information handling system 100, such as component 106, accessing module 108 by reading data from module 108, writing data to module 108, or the like, controller/processor 102 may be configured to increment the first value stored in register 108. Additionally, controller/processor 102 may be configured to store a time stamp in register 108 that corresponds to a time at which the access to module 108 occurred (e.g., the second value). In some embodiments, the register 108 may be cleared or reset at predetermined times, such as regular intervals, with the value in the register 108 reflecting a number of accesses in a predetermined time window that can be compared to accesses in earlier time periods to determine an access rate. In replacement of or in addition to storing access data in register 108, access data may be stored in any memory of information handling system 100, any component of information handling system 100 having a memory, or any combination thereof.

During a cycle of operation, controller/processor 102 may be configured to derive temperature patterns based on the access data. The temperature patterns may correspond to a temperature profile of module 108, such as whether a temperature at module 108, an environment proximate to module 108, or both is increasing over time, decreasing over time, remaining constant over time, fluctuating randomly over time, etc. Additionally, controller/processor 102 may be configured to implement open-loop control of cooling device 158 based on the temperature patterns to regulate a temperature profile and/or a temperature of module 108, an environment proximate to module 108, or both.

In embodiments, during the cycle of operation, controller/processor 102 may be configured to provide the access data to time series algorithm 154. Controller/processor 102, executing instructions corresponding to time series algorithm 154, may be configured to determine an access rate of module 108 based on the access data. The access rate of module 108 may include or correspond to a rate of change of the access data (e.g., a rate of change of the access data as a function of time or over a specified period of time). For instance, the access rate may include or correspond to an average rate of change of the access data, an instantaneous rate of change of the access data, or both. Moreover, controller/processor 102, executing time series algorithm 154, may be configured to identify patterns in the access rate of module 108. For instance, a first pattern of the patterns may include or correspond to an increasing rate of change of the access data, while a second pattern of the patterns may include or correspond to a decreasing rate of change of the access rate. Since a power use of module 108 is proportional to (e.g., linearly related to) an access rate of module 108, and since a temperature of module 108, of an environment proximate to module 108, or both is proportional to (e.g., linearly related to) power use of module 108, controller/processor 102 may be configured to derive temperature patterns corresponding to a temperature profile of module 108 based on the access rate and, hence, the access data.

Moreover, controller/processor 102 may be configured to initiate open-loop control of cooling device 158, based on the temperature patterns, by executing thermal regulation algorithm 156. For instance, in response to a temperature pattern indicative of an accelerating increase in a temperature and/or a temperature profile at module 108, an environment proximate to module 108, or both, controller/processor 102, executing thermal regulation algorithm 156, may initiate open-loop control of cooling device 158 to regulate a temperature and/or a temperature profile of module 108, an environment proximate to module 108, or both. Open-loop control of cooling device 158 may correspond to controlling a speed of a fan (e.g., when cooling device 158 corresponds to a fan), such as increasing or decreasing the speed of a fan without using, by controller/processor 102, feedback data, such as temperature measurements, taken at or proximate to module 108. Additionally or alternatively, open-loop control of cooling device 158 may correspond to prioritizing cooling of modules having relatively high access rates and/or a large number of accesses over a specified timeframe over modules having relatively low access rates and/or a smaller number of accesses over the specified timeframe also without using, by controller/processor 102, feedback data such as measurements taken from sensors (e.g., temperature sensors, voltmeters, etc.) at or proximate to module 108.

Additionally, controller/processor 102, executing thermal regulation algorithm 156, may be configured to initiate closed loop control of cooling device 158. After initiation of open-loop control of cooling device 158, controller/processor 102, executing thermal regulation algorithm 156, may be configured to initiate closed-loop control of cooling device 158 when one or more criteria are satisfied. For example, after initiating open-loop control and in response to identifying a temperature pattern that is relatively constant (e.g., with few temperature fluctuations over time), controller/processor 102, executing thermal regulation algorithm 156, may initiate closed-loop control of cooling device 158.

Controller/processor 102 may be configured to dynamically and iteratively derive temperature patterns in response to receipt, by controller/processor 102, of updated access data. To elaborate, the access data most likely changes over time based on changes, over time, in access to module 108 by, for example, components of information handling system 100, such as component 106. Thus, controller/processor 102 may be configured to periodically obtain updated access data from register 108 (or other memories configured to store the access data) to update derivations of temperature patterns based on the updated access data, thereby accurately reflecting a time-varying temperature profile of module 108. In this manner, controller/processor 102 may be configured to rapidly respond to temperature fluctuations at the module.

Access data may change over relatively short timeframes, such as within milliseconds, microseconds, etc. and large volumes of access data (e.g., megabytes, gigabytes, etc.) may be available for processing. Accordingly, controller/processor 102 may be configured to quickly (e.g., within milliseconds, microseconds, etc.) process large volumes (e.g., megabytes, gigabytes, etc.) of access data to derive temperature patterns corresponding to a temperature profile of module 108. By rapidly identifying temperature patterns, controller/processor 102 is configured to rapidly initiate open-loop control of cooling device 158 to quickly mitigate unfavorable temperature fluctuations, such as rapidly rising temperatures, in module 108, in an environment proximate to module 108, or both.

Figure 2:
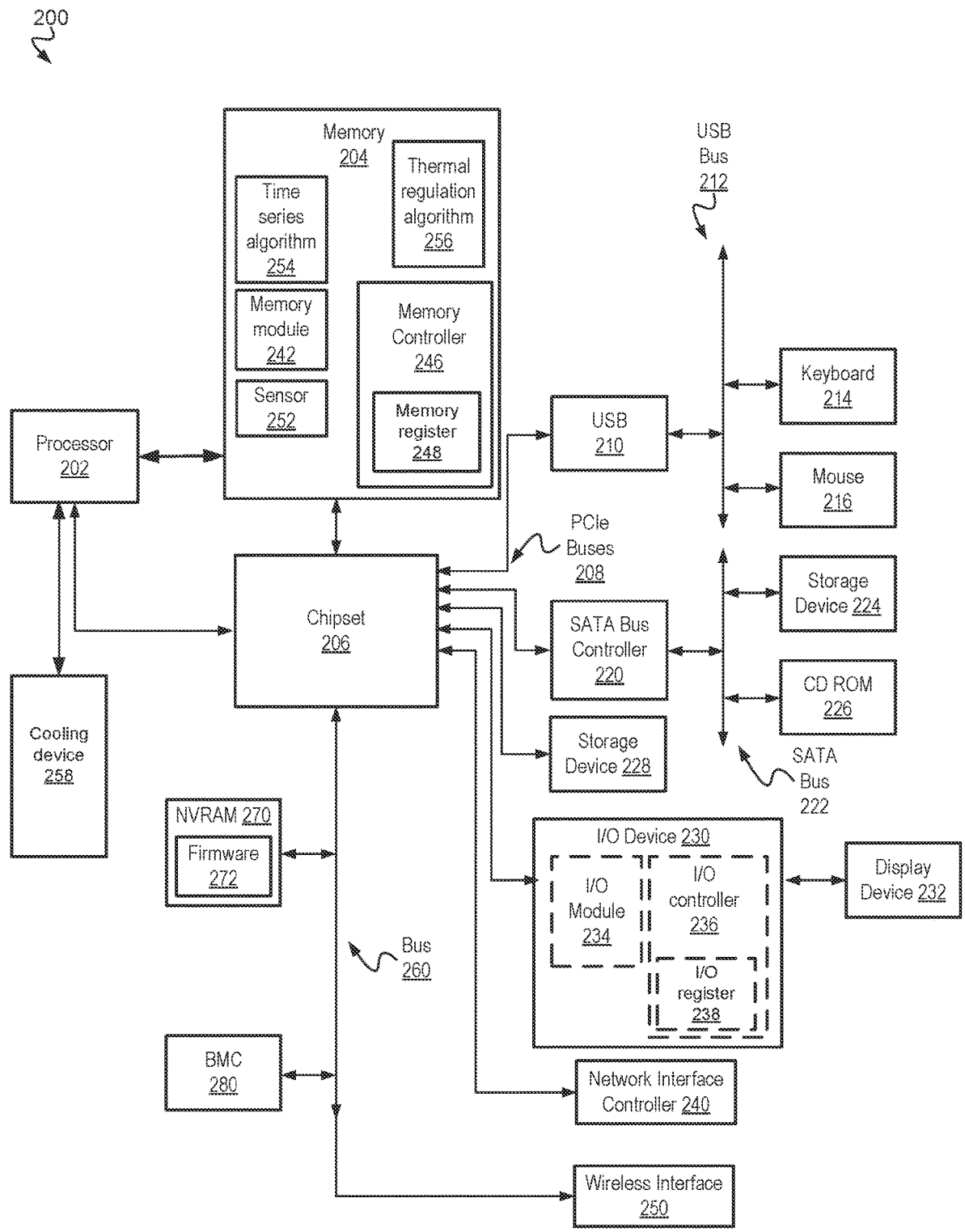
FIG. 2 is a schematic block diagram of an example information handling system in which thermal management is deployed and providing an overview of implementation of thermal management in a typical information handling system according to some embodiments of the disclosure.

FIG. 2 is a schematic block diagram of an example information handling system 200 in which thermal management is deployed and providing an overview of thermal management in the context of information handling system 200. Information handling system 200 may include processor 202 (e.g., a central processing unit (CPU)), memory (e.g., double data rate (DDR) 5 memory) 204, and chipset 206. In some embodiments, one or more of processor 202, memory 204, and chipset 206 may be included on a motherboard (also referred to as a mainboard), which is a printed circuit board (PCB) with embedded conductors organized as transmission lines among processor 202, memory 204, chipset 206, and/or other components of information handling system 200. The components may be coupled to the motherboard through packaging connections such as a pin grid array (PGA), ball grid array (BGA), land grid array (LGA), surface-mount technology, and/or through-hole technology. In some embodiments, one or more of processor 202, memory 204, chipset 206, and/or other components may be organized as a System on Chip (SoC).

Processor 202 may execute program code by accessing instructions (e.g., instructions corresponding to time series algorithm 254, thermal regulation algorithm 256, or both) loaded into memory 204 from a storage device, executing the instructions to operate on data also loaded into memory 204 from a storage device, and generate output data that is stored back into memory 204 or sent to another component. Processor 202 may include processing cores capable of implementing any of a variety of instruction set architectures (ISAs), such as the x86, POWERPC®, ARM®, SPARC®, or MIPS® ISAs, or any other suitable ISA. In multi-processor systems, each of processors 202 may commonly, but not necessarily, implement the same ISA. In some embodiments, multiple processors may each have different configurations such as when multiple processors are present in a big-little hybrid configuration with some high-performance processing cores and some high-efficiency processing cores. Chipset 206 may facilitate the transfer of data among processor 202, memory 204, and other components. In some embodiments, chipset 206 may include two or more integrated circuits (ICs), such as a northbridge controller coupled to processor 202, memory 204, and a southbridge controller, with the southbridge controller coupled to the other components such as USB 210, serial advanced technology attachment (SATA) bus controller 220, and peripheral component interconnect (PCIe) buses 208. Chipset 206 may couple to other components through one or more PCIe buses 208.

Some components may be coupled to one bus line of PCIe buses 208, whereas some components may be coupled to more than one bus line of PCIe buses 208. One example component is universal serial bus (USB) controller 210, which interfaces chipset 206 to USB bus 212. USB bus 212 may couple input/output components such as keyboard 214 and mouse 216, but also other components such as USB flash drives, or another information handling system. Another example component is SATA bus controller 220, which couples chipset 206 to SATA bus 222. SATA bus 222 may facilitate efficient transfer of data among chipset 206 and components coupled to chipset 206 and storage device 224 (e.g., a hard disk drive (HDD) or solid-state disk drive (SDD)) and/or compact disc read-only memory (CD-ROM) 226. PCIe bus 208 may also couple chipset 206 directly to storage device 228 (e.g., a solid-state disk drive (SDD)). A further instance of an example component is input/output (I/O) device 230 (e.g., a graphics processing unit (GPU)) or graphics card for generating output to display device 232). Other instances of components include network interface controller (NIC) 240 and/or wireless interface 250 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example embodiment, chipset 206 may be directly connected to an individual end point via a PCIe root port within the chipset and a point-to-point topology as shown in FIG. 2.

Chipset 206 may also be coupled to a serial peripheral interface (SPI) and/or Inter-Integrated Circuit (I2C) bus 260, which couples chipset 206 to system management components. For example, non-volatile random-access memory (NVRAM) 270 for storing firmware 272 may be coupled to the bus 260. As another example, controller, such as baseboard management controller (BMC) 280, may be coupled to chipset 206 through bus 260. BMC 280 may be referred to as a service processor or embedded controller (EC). Capabilities and functions provided by BMC 280 may vary considerably based on the type of information handling system. For example, the term baseboard management system may be used to describe an embedded processor included at a server, while an embedded controller may be found in a consumer-level device. As disclosed herein, BMC 280 represents a processing device different from processor 202, which provides various management functions for information handling system 200. For example, an embedded controller may be responsible for power management, cooling management, and the like. An embedded controller included at a data storage system may be referred to as a storage enclosure processor or a chassis processor.

Information handling system 200 may include additional processors that are configured to provide localized or specific control functions, such as a battery management controller. Bus 260 can include one or more busses, including a Serial Peripheral Interface (SPI) bus, an Inter-Integrated Circuit (I2C) bus, a system management bus (SMBUS), a power management bus (PMBUS), or the like. BMC 280 may be configured to provide out-of-band access to devices at information handling system 200. Out-of-band access in the context of bus 260 may refer to operations performed prior to execution of firmware 272 by processor 202 to initialize operation of system 200.

Firmware 272 may include instructions executable by processor 202 to initialize and test the hardware components of information handling system 200. For example, the instructions may cause processor 202 to execute a power-on self-test (POST). The instructions may further cause processor 202 to load a boot loader or an operating system (OS) from a mass storage device. Firmware 272 additionally may provide an abstraction layer for the hardware, such as a consistent way for application programs and operating systems to interact with the keyboard, display, and other input/output devices. When power is first applied to information handling system 200, the system may begin a sequence of initialization procedures, such as a boot procedure or a secure boot procedure. During the initialization sequence, also referred to as a boot sequence, components of information handling system 200 may be configured and enabled for operation and device drivers may be installed. Device drivers may provide an interface through which other components of information handling system 200 can communicate with a corresponding device. Firmware 272 may include a basic input-output system (BIOS) and/or include a unified extensible firmware interface (UEFI). Firmware 272 may also include one or more firmware modules of the information handling system. Additionally, configuration settings for the firmware 272 and firmware of the information handling system 200 may be stored in the NVRAM 270. NVRAM 270 may, for example, be a non-volatile firmware memory of the information handling system 200 and may store a firmware memory map namespace of information handling system 200. NVRAM 270 may further store one or more container-specific firmware memory map namespaces for one or more containers concurrently executed by the information handling system.

Information handling system 200 may include additional components and additional busses, not shown for clarity. For example, information handling system 200 may include multiple processor cores (either within processor 202 or separately coupled to chipset 206 or through PCIe buses 208), audio devices (such as may be coupled to chipset 206 through one of the PCIe busses 208), or the like. While a particular arrangement of bus technologies and interconnections is illustrated for the purpose of example, one of skill will appreciate that the techniques disclosed herein are applicable to other system architectures. Information handling system 200 may include multiple processors and/or redundant bus controllers. In some embodiments, one or more components may be integrated together in an integrated circuit (IC), which is circuitry built on a common substrate. For example, portions of chipset 206 can be integrated within processor 202. Additional components of information handling system 200 may include one or more storage devices that may store machine-executable code, one or more communications ports for communicating with external devices, and various input and output (I/O) devices, such as a keyboard, a mouse, and a video display. Additionally, information handling system 200 may include cooling device 258 (e.g., one or more cooling devices) configured for thermal management of one or more components of information handling system 200 and/or an environment proximate to the one or more components of information handling system 200. Cooling device 258 may be a fan, a phase change material (PCM) such as salt hydrates, an air conditioning system, or any of the foregoing. While FIG. 2 illustrates cooling device 258 as being coupled to processor 202, cooling device 258 may be coupled to memory 204, memory controller 246, I/O device 230, I/O controller 236, BMC 280, or any combination thereof.

In some embodiments, processor 202 may include multiple processors, such as multiple processing cores for parallel processing by information handling system 200. For example, information handling system 200 may include a server comprising multiple processors for parallel processing. In some embodiments, information handling system 20 may support virtual machine (VM) operation, with multiple virtualized instances of one or more operating systems executed in parallel by information handling system 200. For example, resources, such as processors or processing cores of the information handling system may be assigned to multiple containerized instances of one or more operating systems of information handling system 200 executed in parallel. A container may, for example, be a virtual machine executed by information handling system 200 for execution of an instance of an operating system by information handling system 200. Thus, for example, multiple users may remotely connect to information handling system 200, such as in a cloud computing configuration, to utilize resources of information handling system 200, such as memory, processors, and other hardware, firmware, and software capabilities of information handling system 200. Parallel execution of multiple containers by information handling system 200 may allow information handling system 200 to execute tasks for multiple users in parallel secure virtual environments.

While each hardware component of information handling system 200 may generate and dissipate heat during operation, certain components might generate and dissipate more heat than other components. For example, memory 204, I/O device 230, or both may generate and/or dissipate more heat than other components of information handling system 200 due to multiple factors such as a density of electronic components within memory 204, I/O device 230, or both, multiple accesses (e.g., read and write operations) to memory 204, I/O device 230, or both, or any combination of these. Additionally or alternatively and in some instances, while I/O device 230 may not generate or dissipate more heat than other components of information handling system 200, I/O device 230 may lack sensors to measure a temperature at or proximate to I/O device 230, a voltage regulator (VR) or other circuitry to measure a voltage at or proximate to I/O device 230 (and thus a power consumed by I/O device 230), or both.

To elaborate, memory 204 may include one or more memory modules, depicted in FIG. 2 and referred to collectively as memory module 242. For instance, memory 204 may include four or more memory modules. Additionally, memory 204 may include one or more memory controllers, referred to as memory controller 246, coupled to memory module 242 (e.g., in embodiments, memory controller 246 may be coupled to four or more memory modules). Memory 204 may further include sensor 252 associated with each memory module 242. Sensor 252 may be a thermocouple (or other device configured to measure a temperature at memory module 242, in an environment proximate to memory module 242, or both), a voltage regulator (VR) configured to measure a voltage at memory module 242 (and from which power consumption at memory module 242 can be determined), or any combination thereof. Additionally, memory 204 may be configured to store one or more instruction sets corresponding to algorithms, such as instruction sets corresponding to time series algorithm 254, thermal regulation algorithm 256, or both. Further, memory 204 may include memory register 248 configured to store data, such as access data described with reference to FIG. 1.

I/O device 230 may include one or more I/O modules (e.g., I/O module 234), I/O controller 236, or both. I/O controller 236 may include I/O register 238 (e.g., configured to store access data such as access data referred to with reference to FIG. 1). While not depicted in FIG. 2 and in embodiments, I/O controller 236 may include one or more memories configured to store instructions, such as instructions corresponding to an instantiation of time series algorithm 254, thermal regulation algorithm 256, or both. In other embodiments, I/O device 230 may lack I/O controller 236, I/O module 234, I/O register 238, or combinations thereof.

Memory 204, I/O device 230, or both may correspond to module 108 of FIG. 1. Additionally or alternatively, memory module 242, I/O module 234, or both may correspond to module 108 of FIG. 1. Moreover, memory controller 246, I/O controller 236, or both may correspond to controller/processor 102 of FIG. 1. Additionally, memory register 248, I/O register 238, or both may correspond to register 108 of FIG. 1.

While a temperature at or proximate to an environment of memory module 242 may be measured by collecting data from sensor 252 (e.g., temperature data, voltage data (indicative of power consumption), etc.), in embodiments in which memory 204 has multiple memory modules, multiple sensors, or both, the collection and analysis of such data by, for example, memory controller 246, processor 202, or other processing device, is likely to be slow and time consuming due to a volume of data to collect and analyze. Meanwhile, since the temperature at or proximate to memory module 242 is likely to fluctuate quickly over relatively short time periods (e.g., milliseconds, microseconds, etc.), a processing device (e.g., memory controller 246, processor 202, etc.) receiving data from sensors is likely to receive data that may be indicative of a past state of a temperature at memory module 242, an environment proximate to memory module 242, or both rather than a current or actual state of the temperature at memory module 242, an environment proximate to memory module 242, or both. Moreover, once the processing device (e.g., memory controller 246, processor 202, etc.) analyzes the data and initiates a thermal regulation algorithm (e.g. thermal regulation algorithm 256) to control one or more cooling devices (e.g., cooling device 258), additional time is likely to pass since the data was collected from sensor 252, with the result that an actual or current state of a temperature at memory module 242, an environment proximate to memory module 242, or both is likely to deviate further from the collected data. As a result, thermal management that relies on such sensor data may be inefficient (e.g., from a power usage perspective), inadequate, and/or ineffective, resulting in possible damage to memory 204 (and/or one or more components thereof), operational deterioration of memory 204 (and/or one or more components thereof), or both.

While similar problems as described with reference to memory 204 might affect traditional thermal management techniques as applied to I/O device 230, traditional thermal management techniques, as applied to I/O device 230, may, alternatively or additionally, be relatively ineffective due to lack of operational information about I/O device 230 (and/or one or more components thereof). To elaborate, information management system 200 may lack data about thermal tolerances of one or more components of I/O device 230. Thus, even if timely and accurate data, indicative of a temperature at I/O device 230, power usage by I/O device 230, or both were to be received at a processing device (e.g., I/O controller 236, processor 202, BMC 280, etc.), the processing device may lack data regarding acceptable heat tolerances of I/O device 230 and/or one or more components thereof. Further, in many instances I/O device 230 (e.g., graphics cards, etc.) often lack sensors, with the result that data indicative of a temperature at I/O device 230, power usage by I/O device 230, or both may be unavailable to implement thermal management at I/O device 230 (and/or components thereof).

As a solution to the forgoing problems, information management system 200 may be configured to implement thermal management at memory 204, I/O device 230, or both based on temperature patterns derived from access data. To illustrate, memory register 248 (or any other memory device of information handling system 200 such as memory 204 itself) may be configured to store first access data, which may include a first number of accesses to memory module 242, first time values corresponding to each of the first number of accesses, or both. Memory controller 246 may be configured to derive, based on the first access data, first temperature patterns corresponding to a first temperature profile of memory module 242, a first environment proximate to memory module 242, or both. The first temperature profile of memory module 242, a first environment proximate to memory module 242, or both may be a temperature thereof at any instant of time, over a designated timeframe, such as a timeframe designated by a user of information handling system 200 or programmed as a parameter in time series algorithm 254, thermal regulation algorithm 256, or both, or a combination of these. Moreover, memory controller 246 may be configured to initiate, based on the first temperature patterns, open-loop control of cooling device 258 (e.g., a first cooling device), which is configured to regulate a first temperature and/or a first temperature profile of memory module 242, an environment proximate to memory module 242, or both in response to instructions received, at cooling device 258 (e.g., a first cooling device), from memory controller 246.

Additionally, a processor of information handling system 200 (e.g., processor 202, BMC 280, I/O controller 236) coupled to I/O device 230 may be configured to derive, based on second access data, a second temperature pattern corresponding to a second temperature profile of I/O device 230, a second environment proximate to I/O device 230, or both. The second temperature profile of I/O device 230, a second environment proximate to I/O device 230, or both may be a temperature thereof at any instant of time, over a designated timeframe, such as a timeframe designated by a user of information handling system 200 or programmed as a parameter in time series algorithm 254, thermal regulation algorithm 256, or both, or a combination of these. The second access data may include a second number of accesses to I/O device 230 (e.g., corresponding to one or more operations performed at I/O device 230, such as a read operation at I/O device 230, a write operation at I/O device 230, or both), second time values corresponding to each of the second number of accesses, or both. Moreover, the processor of information handling system 200 (e.g., processor 202, BMC 280, I/O controller 236, etc.) may be configured to initiate open-loop control, based on the second temperature patterns, of cooling device 258 (e.g., a second cooling device), which may be configured to regulate a second temperature and/or second temperature profile of I/O device 230, a second environment proximate to I/O device 230, or both, in response to instructions received, at cooling device 258 (e.g., a second cooling device) from the processor.

Memory controller 246, the processor (e.g., processor 202, BMC 280, I/O controller 236, etc.), or both configured to implement open-loop control may include providing, by memory controller 246, the processor (e.g., processor 202, BMC 280, I/O controller 236, etc.), or both instructions to cooling device 258 (e.g., first cooling device, second cooling device) to control operational aspects of cooling device 258. For example, if cooling device 258 is a fan, then open-loop control may include controlling, by memory controller 246, the processor (e.g., processor 202, BMC 280, I/O controller 236, etc.), or both, a speed at which the fan operates without use, at memory controller 246, the processor (e.g., processor 202, BMC 280, I/O controller 236, etc.), or both, of feedback data, such as measurements from sensors (e.g., sensor 252) placed at or proximate to one or more memory modules 242, at or proximate to I/O device 230, or both. Additionally or alternatively, in implementing open-loop control, memory controller 246, the processor (e.g., processor 202, BMC 280, I/O controller 236, etc.), or both may change a priority level of instructions to control cooling device 258 (e.g., first cooling device, second cooling device, etc.) by increasing a priority level of such instructions (e.g., in response to first temperature patterns and/or second temperature patterns indicating increasing temperatures) or decreasing a priority level of such instructions (e.g. in response to first temperature patterns and/or second temperature patterns indicating decreasing temperatures), all without use, by memory controller 246, the processor (e.g., processor 202, BMC 280, I/O controller 236, etc.), or both, of feedback data, such as measurements from sensors (e.g., sensor 252) placed at or proximate to one or more memory modules 242, at or proximate to I/O device 230, or both.

In embodiments in which the processor corresponds to processor 202, second access data may be stored in memory module 242. Alternatively, in embodiments in which the processor corresponds to I/O controller 236, the second access data may be stored in I/O register 238. In general, the processor (e.g., processor 202, BMC 280, I/O controller 236, etc.) may be configured to access one or more memories of information handling system 200 in which the second access data may be stored. Moreover, the processor (e.g., processor 202, BMC 280, I/O controller 236, etc.) may be configured to access instructions stored in one or more memories of information handing system 200 (e.g., memory 204), and the instructions may correspond to time series algorithm 254, thermal regulation algorithm 256, or both.

In embodiments, memory controller 246 configured to derive the first temperature patterns includes memory controller 246 configured to determine a first access rate of the first access data. Additionally, memory controller 246 configured to initiate, based on the first temperature patterns, the open-loop control of cooling device 258 (e.g., the first cooling device) includes memory controller 246 configured to initiate open-loop control in response to the first access rate. Moreover, the processor (e.g., processor 202, BMC 280, I/O controller 236, etc.) configured to derive, based on the second access data, the second temperature patterns includes the processor configured to determine a second access rate of the second access data. Additionally, the processor (e.g., processor 202, BMC 280, I/O controller 236, etc.) configured to initiate the open-loop control of cooling device 258 (e.g., the second cooling device) further includes the processor configured to initiate the open-loop control based on the second access rate.

The first access rate may correspond to a first rate of change of the first access rate as a function of time (e.g., an average rate of change, an instantaneous rate of change, etc.) or over time. Similarly, the second access rate may correspond to a second rate of change of the second access data as a function of time (e.g., an average rate of change, an instantaneous rate of change, etc.) over time. In response to an increasing first access rate, indicative of a rising first temperature (and/or first temperature profile), memory controller 246 may be configured to initiate open-loop control of cooling device 258 (e.g., the first cooling device) to reduce a rate of increase of the first temperature (and/or first temperature profile), to reduce the first temperature (and/or first temperature profile), or both. As another example, in response to an increasing second access rate, indicative of an increasing second temperature (and/or second temperature profile), the processor (e.g., e.g., processor 202, BMC 280, I/O controller 236, etc.) may be configured to initiate open-loop control of cooling device 258 (e.g., the second cooling device) to reduce a rate of increase of second temperature (and/or second temperature profile), to reduce the second temperature (and/or second temperature profile), or both.

Additionally or alternatively, in response to a decreasing first access rate, indicative of a falling first temperature (and/or first temperature profile), memory controller 246 may be configured to reduce an execution priority of thermal management tasks, such as instructions, in an execution queue of memory controller 246, configured to regulate the first temperature (and/or first temperature profile). As another example, in response to a decreasing second access rate, indicative of a falling second temperature (and/or second temperature profile), the processor (e.g., processor 202, BMC 280, I/O controller 236, etc.) may be configured to reduce a priority of thermal management tasks, such as instructions, in the execution queue of the processor, configured to regulate the second temperature (and/or second temperature profile).

Further, memory controller 246, the processor (e.g., processor 202, BMC 280, I/O controller 236, etc.), or both may be configured to predict the first temperature (and/or first temperature profile), the second temperature (and/or the second temperature profile), or both based on the first patterns and the second patterns, respectively. For example, memory controller 246, the processor (e.g., processor 202, BMC 280, I/O controller 236, etc.), or both, executing one or more instruction sets (e.g., thermal regulation algorithm 256) may be configured to predict a trend in the first temperature (and/or first temperature profile), the second temperature (and/or second temperature profile), or both. Additionally, based on the prediction of the first temperature (and/or first temperature profile) and the second temperature (and/or second temperature profile), memory controller 246 and the processor (e.g., processor 202, BMC 280, I/O controller 236, etc.) may be configured to initiate the open-loop control of cooling device 258 (the first cooling device, the second cooling device) in expectation of a rapid in the first temperature (and/or first temperature profile) and/or the second temperature (and/or second temperature profile), respectively.

In embodiments, memory controller 246, the processor (e.g., processor 202, BMC 280, I/O controller 236, etc.), or both, may be configured to initiate closed loop control of cooling device 258 (the first cooling device and the second cooling device, respectively) after initiation of open-loop control thereof. For instance, memory controller 246, the processor (e.g., processor 202, BMC 280, I/O controller 236, etc.), or both may be configured to initiate closed loop control of cooling device 258 (e.g., the first cooling device and the second cooling device, respectively) in response to a determination that the first access rate and/or the second access rate, respectively, are constant, decreasing, or increasing at a reduced rate.

Figure 3:
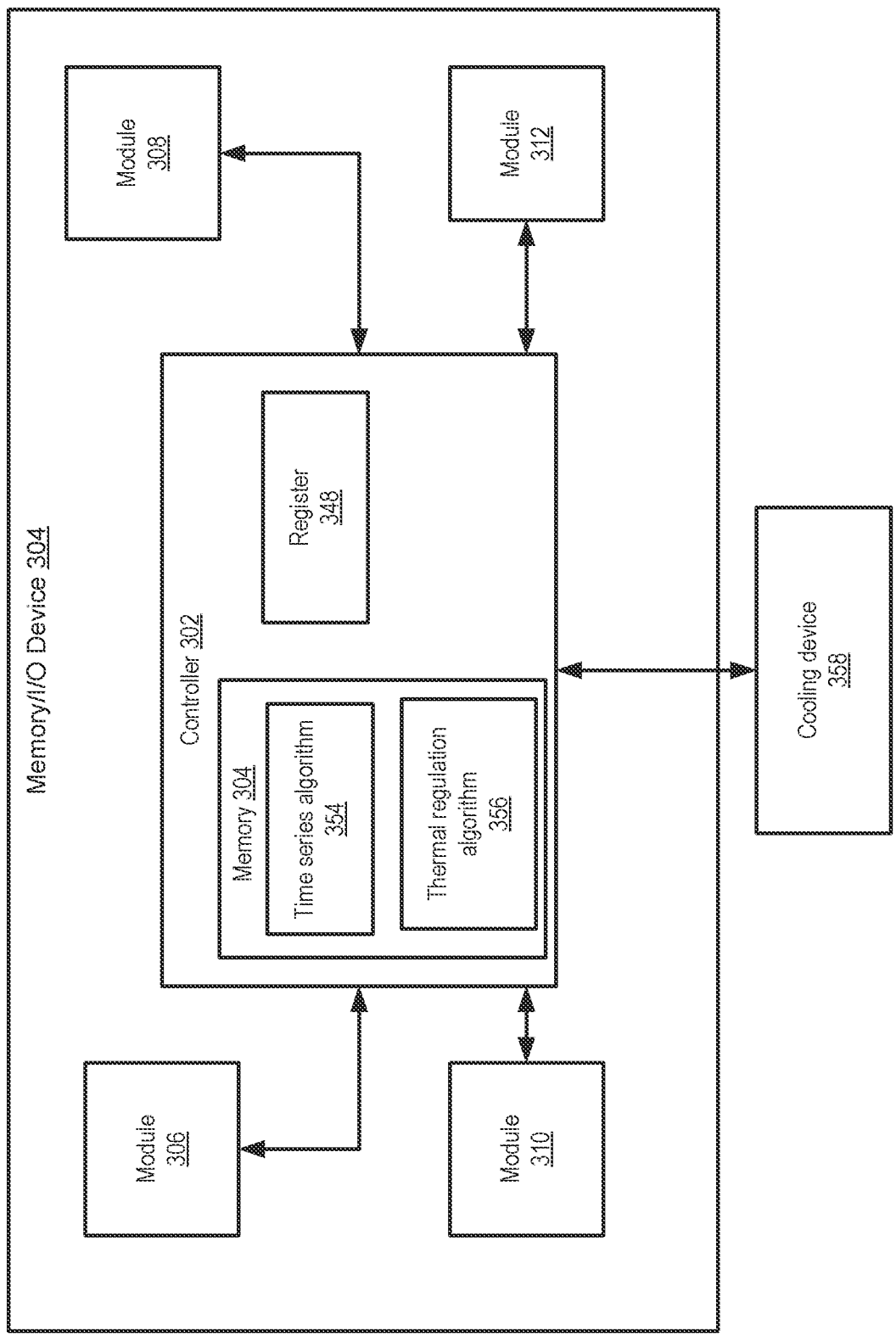
FIG. 3 is a schematic block diagram of an example multi-module device according to some embodiments of the disclosure.

As can be appreciated, the disclosure is implementable in hardware components having a wide range of topologies. Referring to FIG. 3, a schematic block diagram of an example multi-module device, according to some embodiments of the disclosure, is presented. Information handling system 300 may include memory/I/O device 304 and cooling device 358 (e.g., which may correspond to a plurality of cooling devices). Memory/I/O device 304 may include a plurality of modules, such as modules 306-312. Additionally, memory/I/O device 304 may include controller 302, memory 304, and register 348. Memory 304 may be configured to store a non-transitory computer readable medium including instructions to implement time series algorithm 354, thermal regulation algorithm 356, or both and having functionality described in this disclosure.

Modules 306-312 may correspond to one or more memory modules (e.g., memory module 242 of FIG. 2), one or more I/O modules (e.g., I/O module 234 of FIG. 2), or other sub-components of memory/I/O device 304. Additionally, while register 348 is depicted as being separate from memory 304, in embodiments, register 348 may be a component of memory 304.

During operation, controller 302, executing time series algorithm 354, may be configured to derive temperature patterns corresponding to a temperature profile (e.g., actual temperatures at any instances of time, temperatures over a specified timeframe, etc.) of each of modules 306-312, environments proximate to modules 306-312, or both, using techniques described with respect to processor/controller 102 of FIG. 1, memory controller 248 and the processor (e.g., processor 202, I/O controller 236, BMC 280, etc.) of FIG. 2, or any combination thereof. Additionally, controller 302, executing thermal regulation algorithm 356, may be configured to initiate open-loop control of cooling device 358 to regulate a temperature (and/or temperature profile) at and/or in an environment proximate to any one of modules 306-312 using techniques described with to processor/controller 102 of FIG. 1, memory controller 248 and the processor (e.g., processor 202, I/O controller 236, BMC 280, etc.) of FIG. 2, or any combination thereof.

Figure 4:
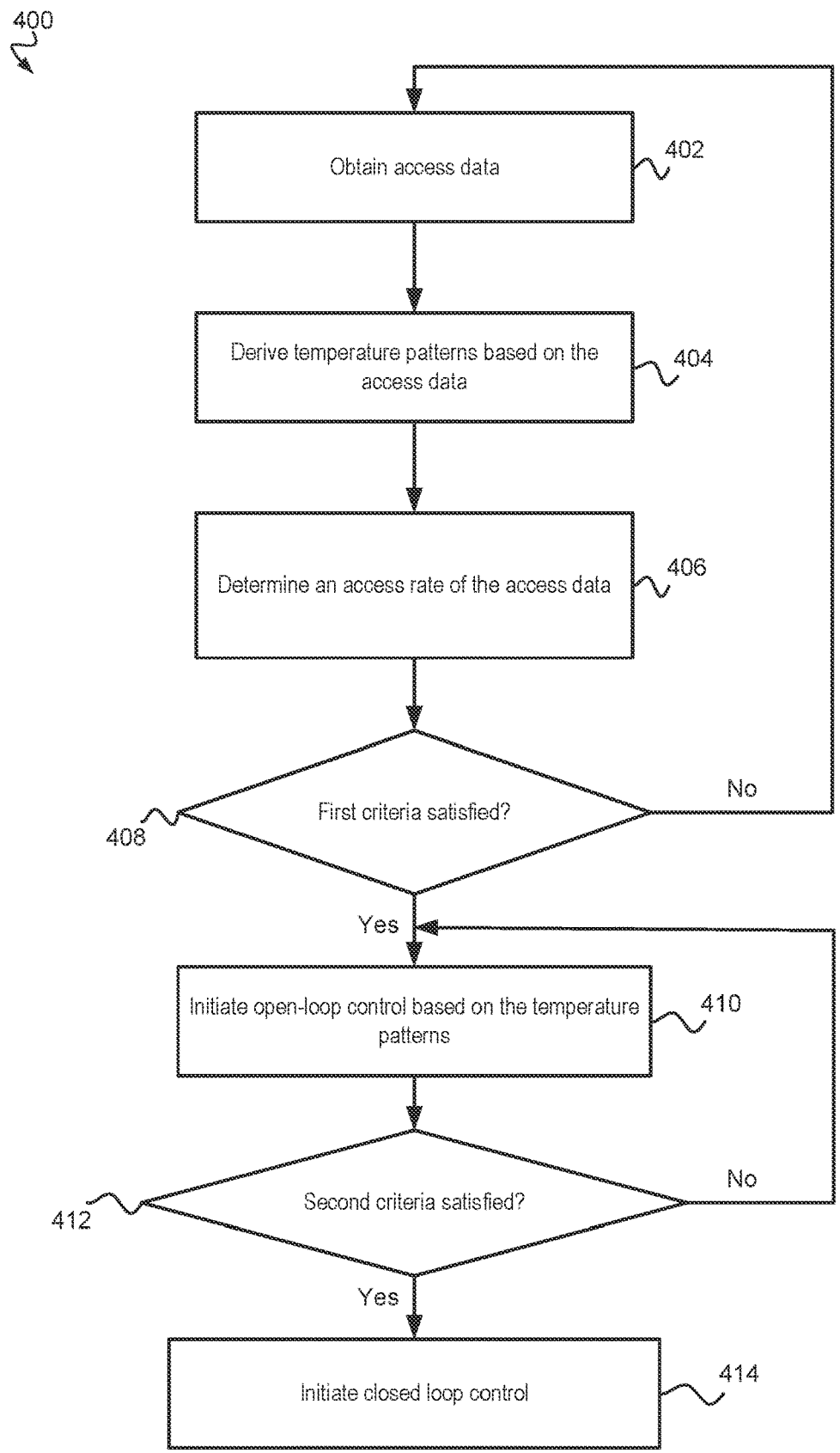
FIG. 4 is a flow chart of an example method for temperature regulation according to some embodiments of the disclosure.

A more detailed description of operation of memory/I/O device 304 is provided with reference to FIG. 4, which is a flow chart of an example method 400 for temperature regulation at one or more modules of an information handling system, according to some embodiments of the disclosure. While method 400 is described with respect to memory/I/O device 304, it is understood that method 400 may be implemented in processor/controller 102 of FIG. 1, memory controller 246 of FIG. 2, or the processor (e.g., processor 202, I/O controller 236, BMC 280) of FIG. 2. At block 402, access data may be obtained, such as by a processor of an information handling system. The access data may correspond to a number of accesses, at one or more first components of an information handling system, by one or more second components of the information handling system, times during which each of these accesses occur, or both. Thereafter, at block 404, temperature patterns (e.g., one or more temperature patterns) may be derived, by the processor of the information handling system, based on the access data. The temperature patterns may correspond to a temperature profile of the one or more first components of the information handling system, an environment proximate to the one or more first components of the information handling system, or both. In embodiments, the temperature patterns may be derived, at block 406, by determining an access rate of the access data. Subsequently, at block 408, it may be determined with first criteria are satisfied, such as criteria to initiate open-loop control. If, at block 408, first criteria are not satisfied, method 400 may return to block 402 (proceeding through to block 408 via blocks 404 and 406). Otherwise, if, at block 408, first criteria are satisfied, method 400 may proceed to block 410. At block 410, open-loop control of a cooling device of the information handling system may be initiated to regulate the temperature at the one or more first components, the environment proximate to the one or more first components, or both based on the temperature patterns. Thereafter, method 400 may proceed to block 412, at which it is determined whether second criteria are satisfied. The second criteria may correspond to criteria to initiate closed loop control. If second criteria are not satisfied, method 400 may return to block 410. Otherwise, if second criteria are satisfied, method 400 may proceed to block 414 at which closed loop control may be initiated.

To elaborate on method 400 in the context of FIG. 3, at block 402, controller 302 may be configured to obtain access data associated with one or more of modules 306-312. In the context of FIG. 3, access data may include a number of times during which another component, such as another component of information handling system 300, accessed (e.g., performed a read operation, a write operation, or both) one or more of modules 306-312. Additionally, the access data may include times corresponding to each access (e.g., a time stamp, etc.). Access data may be stored in register 348 (or any other memory of information handling system 300), and controller 302 may be configured to access register 348 to obtain the access data. Alternatively or additionally, access data may be stored in other memory devices of information handling system 300, such as memory 304. Moreover, access data corresponding to any one or more of modules 306-312 may be stored in each module 306-312, and controller 302 may be configured to obtain the access data from any one or more of modules 306-312.

At block 404, controller 302 may be configured to derive temperature patterns, based on the access data, corresponding to a temperature profile at any one or more of modules 306-312, at an environment proximate to any one or more of modules 306-12, or both. The temperature profile of one or more modules 306-312 may include a temperature at each module 306-312 at any given instant of time, a temperature fluctuations at any one or more modules 306-312 over a period of time (e.g., a timeframe specified in instructions corresponding to time series algorithm 354, thermal regulation algorithm 356, or both), or combinations thereof.

At block 406, controller 302 may determine an access rate of access data associated with any or each module 306-312. For example, controller 302, executing instructions corresponding to time series algorithm 354 stored in memory 304, may be configured to determine an access rate based on the access data and corresponding to a rate of change of the access data as a function of time (e.g., an average rate of change, an instantaneous rate of change, etc.) or over a period of time, such as a timeframe that may be specified by controller 302. An increasing access rate may correspond to increasing power usage at any one of modules 306-312 from which access data was obtained, thereby indicating an increasing temperature (and/or temperature profile) at modules 306-312. Additionally, controller 302, executing instructions corresponding to time series algorithm 354, may be configured to determine a rate at which the access rate itself changes over time, thereby indicating a rate of increase or a rate of decrease of a temperature (and/or temperature profile) at one or more of modules 306-312, an environment proximate to the one or more modules 306-312, or both.

Additionally or alternatively, deriving, by controller 302, temperature patterns of any one or more of modules 306-312 and that correspond to a temperature profile of any one or more of modules 306-312 may include predicting a future temperature profile at one or more of modules 306-312, an environment proximate to one or more of modules 306-312 or both. To illustrate, controller 302, executing instructions corresponding to any one of time series algorithm 354, thermal regulation algorithm 356, or both, may be configured to use past access data stored in register 348 (or other memory component of memory/I/O device 304) to predict a future temperature profile of any one or more of modules 306-312.

At block 408, controller 302 may be configured to determine whether first criteria have been satisfied to initiate open-loop control. For instance, controller 302 may be configured to identify temperature patterns, based on access data, such as determined in response to an access rate of the access data. The temperature patterns may be indicative of a rising temperature and/or rising temperature profile at one or more modules 306-312, such as a rapidly rising temperature and/or temperature profile over a specified timeframe (e.g., a timeframe programmed into time series algorithm 354, thermal regulation algorithm 356, or both). In response to first criteria not being satisfied, controller 302 may be configured to return to one or more previous blocks, such as block 402. Alternatively, in response to first criteria being satisfied, at block 410, controller 302 may be configured to initiate, based on the temperature patterns, open-loop control of cooling device 358 to regulate a temperature (and/or temperature profile) at the one or more modules 306-312, of an environment proximate to one or more modules 306-312, or both. For example, in response to identifying a temperature pattern indicative of a rising temperature at one or more modules 306-312, such as a rapidly rising temperature over a specified timeframe, controller 302, executing instructions corresponding to thermal regulation algorithm 356, may be configured to initiate open-loop control of cooling device 358. By initiating open-loop control of cooling device 358, a rate of increase of the temperature at one or more modules 306-312 may be reduced, the temperature may be stabilized so that there is no further temperature increase over time, rapid fluctuations in the temperature over time (e.g., rapid increases, rapid decreases, etc.) may be reduced, etc.

At block 412, controller 302 may be configured to determine whether second criteria have been satisfied to initiate closed loop control of cooling device 358. Second criteria may include that a temperature profile of one or more modules 306-312, an environment proximate to one or more modules 306-312, or both has stabilized sufficiently (e.g., exhibits a sufficiently constant temperature over time), that a rate of increase of the temperature profile of one or more modules 306-312 has decreased, that a temperature of one or more modules 306-312 is decreasing over a specified timeframe (e.g., a timeframe programmed into thermal regulation algorithm 356), and the like. If controller 302 determines that the second criteria have not been satisfied, controller 302 may be configured to return to previous blocks, such as block 410. As another example, in response to dynamically and iteratively updating temperature pattern derivations corresponding to temperature profiles at modules 306-312 based on updated access data received over time, controller 302 may be configured to determine that a temperature profile of one or more modules 306-312, an environment proximate to one or more modules 306-312, or both has stabilized sufficiently (e.g., exhibits a sufficiently constant temperature over time) to initiate closed loop control of cooling device 358.

Alternatively, if controller 302 determines that the second criteria have been satisfied, at block 414, controller may be configured to initiate closed loop control of cooling device 358. By initiating closed loop control after initiating open-loop control and, for instance, after stabilization of a temperature at one or more modules 306-312, an efficiency of a closed loop control of cooling device 358 is enhanced, at least because cooling device 358 may exert less work (e.g., use less energy) to cool modules 306-312 to a threshold temperature level due to cooling performed via open-loop control. Moreover, open-loop control itself may consume less energy (e.g., by controller 302) than closed loop control. Accordingly, by initiating open-loop control to stabilize a temperature of one or more modules 306-312 and subsequently initiating closed loop control to reduce the temperature of one or more modules 306-312 to a threshold level, an overall energy is saved compared to use only of closed loop control.

Figure 5:
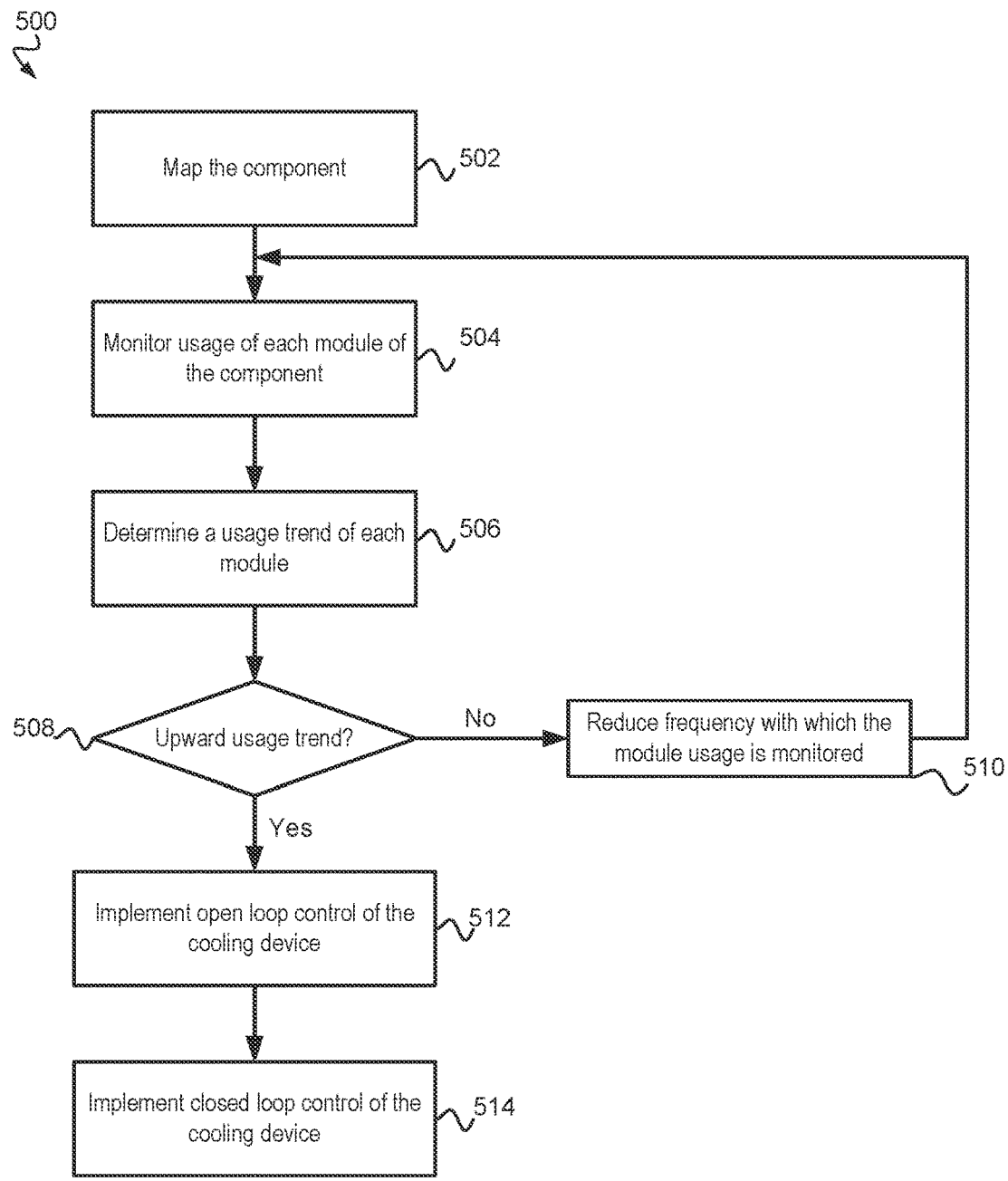
FIG. 5 is a flow chart of an example method for temperature regulation according to some embodiments of the disclosure.

FIG. 5 is a flow chart of an example method 500 for temperature regulation according to some embodiments of the disclosure. At block 502, a component of an information handling system is mapped, such by one or more processors of the information handling system, to obtain such information as a number of modules included in or associated with the component. At block 504, usage of each module of the component of the information handling system is monitored, such as by one or more processors of the information handling system. At block 506, a usage trend is determined corresponding to a usage rate of each module of the component. As above, a usage rate of a module may be linearly related to a power consumption at or by the module, and a power consumption at or by the module may be linearly related to a temperature profile of the module (e.g., temperature fluctuations at the module over time). At block 508, it is determined whether there is an upward usage trend at each module. If there is not an upward usage trend, at block 508, a frequency with which access data of a module is monitored may be reduced. Conversely, if there is an upward usage trend, at block 512, open-loop control of one or more cooling devices of the information handling system is implemented. Thereafter, at block 514, closed loop control of the one or more cooling devices of the information handling system is implemented.

Further description of method 500 in the context of FIG. 3 is provided. However, it will be appreciated that any of the devices described with reference to FIGS. 1-3 are configurable to implement method 500. Accordingly, at block 502, controller 302 is configured to map memory/I/O device 304 to obtain such information as a number of modules 306-312 associated with memory/I/O device 304. At block 504, controller 302 is configured to monitor a usage of one or more modules 306-312. For example, controller 302 may be configured to maintain access data corresponding to a record of each access at any one or more modules 306-312, a time at which each access occurs, or both. In particular and in embodiments, controller 302 may increment a counter each time any module 306-312 is accessed (e.g., a read operation is performed at one or more of modules 306-312, a write operation is performed at one or more of modules 306-312, etc.). Additionally, controller 302 may be configured to include a time stamp tag associated with each increment of the counter and store each count and its corresponding time stamp in a look-up table or other appropriate structure in register 348 or other suitable memory, such as memory 304.

At block 506, controller 302 may be configured to determine a usage trend of each of modules 306-312. In particular and as an example, controller 302 may be configured to determine a usage rate, such as an access data rate, of each of modules 306-312. An increasing access rate corresponding to a module (e.g., any one of modules 306-312) may indicate an increased usage of such module, which, likewise, may indicate an increasing temperature at the module, in an environment proximate to the module, or both.

At block 508, controller 302 may be configured to identify an upward usage trend of any one or more of modules 306-312. For example, controller 302 may be configured to identify that an access rate of any one or more of modules 306-312 is increasing over a specified timeframe, thereby indicating accelerated usage of the corresponding module 306-312; decreasing over a specified timeframe, thereby indicating decelerated usage of the corresponding module 306-312, or remaining relatively constant over a specified timeframe. In response to not identifying an upward usage trend, at block 510, controller 302 may be configured to reduce a frequency with which controller 302 may obtain access data corresponding to one or more modules 306-312. Thereafter, controller 302 may be configured to return to block 504. Conversely, in response to detecting an upward usage trend, at block 512, controller 302 may be configured to implement open-loop control of cooling device 358 to regulate a temperature at one or more of modules 306-312. After implementing open-loop control, at block 514, controller 302 may be configured to implement closed loop control of cooling device 358, such as after controller 302 detects that a temperature at one or more of modules 306-312 has stabilized by remaining relatively constant over a specified timeframe.

The blocks of methods 400, 500 may be executed within extremely short timeframes, such as milliseconds, microseconds, or less, may involve voluminous amounts of access data, such as megabytes, gigabytes, etc., or both. Through quick detection of temperature patterns corresponding to a temperature profile of one or more modules (e.g., within milliseconds, microseconds, nanoseconds, etc.), a processor (e.g., controller 302) executing the blocks of methods 400, 500 is configurable to rapidly respond to sudden temperature increases in the one or more modules, thereby mitigating or avoiding damage to and/or operational degradation of the one or more modules.

The flow chart diagrams of FIGS. 4 and 5 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
a controller configured to couple to a module and to couple to a cooling device, wherein:
the controller comprises logic circuitry and a memory, and
the logic circuitry is configured to perform steps comprising:
storing access data in the memory, wherein the access data comprises a first value corresponding to a number of accesses to the module;
determining temperature patterns based on the access data; and
initiating open-loop control of the cooling device, based on the temperature patterns, to regulate a temperature of the module, an environment proximate to the module, or both.

2. The apparatus of claim 1, wherein the module comprises a memory device, and wherein the number of accesses to the module comprises a number of times that data is written to the memory device, that data is read from the memory device, or both.

3. The apparatus of claim 1, wherein the temperature patterns are configured to predict fluctuations in the temperature over a specified timeframe.

4. The apparatus of claim 1, wherein the access data further comprises a second value corresponding to a time at which each access of the number of accesses occurs.

5. The apparatus of claim 1, wherein the logic circuitry configured to perform the steps comprising determining the temperature patterns based on the access data further comprises the logic circuitry configured to perform the steps comprising determining an access rate of the module based on the access data.

6. The apparatus of claim 5, wherein the access rate corresponds to a rate of change of the access data over a specified timeframe; and wherein the logic circuitry configured to perform the steps comprising initiating the open-loop control of the cooling device comprises the logic circuitry further configured to perform the steps comprising initiating the open-loop control of the cooling device in response to an increasing access rate.

7. The apparatus of claim 1, wherein the logic circuitry is further configured to perform the steps comprising retrieving the access data from the memory, and wherein the logic circuitry configured to perform the steps comprising determining the temperature patterns based on the access data further comprises the logic circuitry configured to perform the steps comprising:
periodically checking the memory to determine whether updated access data has been stored in the memory; and in response to updated access date being stored in the memory, updating the temperature patterns based on the updated access data.

8. The apparatus of claim 1, wherein the logic circuitry is further configured to perform the steps comprising initiating closed loop control of the cooling device, wherein the logic circuitry configured to perform the steps comprising initiating closed loop control of the cooling device further comprises the logic circuitry configured to perform the steps comprising initiating the closed loop control of the cooling device after initiating open-loop control of the cooling device and in response to second criteria, wherein the second criteria comprise a temperature measurement of the temperature, a temperature pattern of the temperature patterns indicating a rapidly increasing temperature of the module, or both.

9. The apparatus of claim 1, wherein the apparatus is positioned within an information handling system, and wherein the cooling device comprises a fan configured to cool the module.

10. An information handling system, comprising:
a memory, wherein the memory comprises:
one or more memory modules configured to store data;
one or more memory controllers coupled to the one more memory modules, wherein the one or more memory controllers are configured to:
determine, based on access data, temperature patterns corresponding to a temperature profile of the one or more memory modules, wherein the access data comprises a number of accesses to the one or more memory modules; and
initiate, based on the temperature patterns, open-loop control of a cooling device, wherein the cooling device is configured to regulate a temperature of the one or more memory modules, and wherein the cooling device is coupled to at least one memory controller of the one or more memory controllers.

11. The information handling system of claim 10, wherein the one or more memory controllers further comprise one or more registers configured to store the access data.

12. The information handling system of claim 10, wherein the one or more memory modules are configured to store the access data.

13. The information handling system of claim 10, wherein:
the access data further comprises time values corresponding to each of the number of accesses;
the one or more memory controllers configured to determine the temperature patterns comprise the one or more memory controllers configured to determine an access rate of the access data; and
the one or more memory controllers configured to initiate, based on the temperature patterns, the open-loop control of the cooling device comprise the one or more memory controllers configured to initiate the open-loop control in response to the access rate.

14. The information handling system of claim 13, wherein the access rate corresponds to a rate of change of the access data.

15. The information handling system of claim 14, wherein:
the one or more memory controllers configured to initiate the open-loop control in response to the temperature patterns comprise the one or more memory controllers configured to initiate the open-loop control in response to an increasing access rate.

16. A method for temperature regulation, the method comprising:
retrieving, by a processor of an information handling system, access data, wherein the access data comprises a number of accesses to a module of the information handling system;
determining, by the processor of the information handling system, a temperature pattern based on the access data, the temperature pattern corresponding to a temperature profile of the module, an environment proximate to the module, or both; and
initiating, by the processor of the information handling system and in response to the temperature pattern, open-loop control of a cooling device of the information handling system, wherein the cooling device is configured to regulate the temperature profile.

17. The method of claim 16, wherein determining, by the processor of the information handling system, the temperature pattern comprises determining, by the processor of the information handling system, an access rate indicative of a rate of change of the access data.

18. The method of claim 16, wherein determining, by the processor, the temperature pattern further comprises:
periodically checking, by the processor and at one or more memories of the information handling system, for updated access data; and
updating, by the processor and in response to the updated access data, the temperature pattern based on the updated access data.

19. The method of claim 16, further comprising after initiating open-loop control, initiating, by the processor of the information handling system, closed loop control of the cooling device in response to second criteria, wherein the second criteria comprise a temperature measurement of a temperature of the module.

20. The method of claim 16, wherein the module comprises a plurality of memory modules or an input/output (I/O) module, and wherein the I/O module comprises a graphics card.

* * * * *